(12) United States Patent
Ulrich et al.

(10) Patent No.: US 10,546,113 B2
(45) Date of Patent: Jan. 28, 2020

(54) PROXIMITY UNLOCK AND LOCK OPERATIONS FOR ELECTRONIC DEVICES

(71) Applicant: Apple Inc., Cupertino, CA (US)

(72) Inventors: Robert R. Ulrich, San Jose, CA (US); Jean-Pierre Cuidad, San Francisco, CA (US); Kevin N. Armstrong, Palo Alto, CA (US); Andreas W. Wendker, Woodside, CA (US); Craig M. Federighi, Los Altos Hills, CA (US); Steve S. Ko, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/998,850

(22) Filed: Aug. 17, 2018

(65) Prior Publication Data
US 2018/0365404 A1    Dec. 20, 2018

Related U.S. Application Data

(62) Division of application No. 14/586,528, filed on Dec. 30, 2014, now Pat. No. 10,055,567.

(60) Provisional application No. 62/005,758, filed on May 30, 2014.

(51) Int. Cl.
*G06F 21/34* (2013.01)
*G06F 21/35* (2013.01)

(52) U.S. Cl.
CPC .............. *G06F 21/34* (2013.01); *G06F 21/35* (2013.01)

(58) Field of Classification Search
CPC .................................. G06F 21/34; G06F 21/35
See application file for complete search history.

(56) References Cited

U.S. PATENT DOCUMENTS

| | | | |
|---|---|---|---|
| 6,594,762 B1 | 7/2003 | Doub et al. | |
| 6,678,824 B1 | 1/2004 | Cannon et al. | |
| 6,886,095 B1 | 4/2005 | Hind et al. | |
| 7,085,595 B2 | 8/2006 | Kitchin | |

(Continued)

FOREIGN PATENT DOCUMENTS

| | | |
|---|---|---|
| CN | 103155528 A | 6/2013 |
| CN | 103427880 A | 12/2013 |

(Continued)

OTHER PUBLICATIONS

Bluetooth Specification Version 4.0, Jun. 30, 2010, available at https://www.bluetooth.org/docman/handlers/downloaddoc.ashx?doc_id=229737.

*Primary Examiner* — Michael R Vaughan
(74) *Attorney, Agent, or Firm* — Sterne, Kessler, Goldstein & Fox P.L.L.C.

(57) ABSTRACT

The described embodiments perform a proximity unlock operation. For the proximity unlock operation, a first electronic device in a locked operating state detects that an authorized second electronic device is in proximity to the first electronic device. Based on detecting the authorized second electronic device in proximity to the first electronic device, the first electronic device transitions from a locked operating state to an unlocked operating state. In the described embodiments, the transition to the unlocked operating state occurs without the user performing a manual authentication step that is performed in existing electronic devices to cause the transition from the locked operating state to the unlocked operating state.

21 Claims, 8 Drawing Sheets

(56) References Cited

U.S. PATENT DOCUMENTS

| | | |
|---|---|---|
| 7,257,374 B1 | 8/2007 | Creigh |
| 7,277,947 B1 | 10/2007 | Van de Sluis et al. |
| 8,249,558 B2 | 8/2012 | Olsen et al. |
| 8,260,879 B2 | 9/2012 | Chan |
| 8,422,503 B2 | 4/2013 | Koichi |
| 8,473,577 B2 | 6/2013 | Chan |
| 8,583,090 B2 | 11/2013 | Vartianen et al. |
| 8,751,451 B2 | 6/2014 | Uola et al. |
| 8,775,850 B2 | 7/2014 | Moy |
| 8,850,052 B2 | 9/2014 | Rosenblatt |
| 8,909,886 B1 | 12/2014 | Clark et al. |
| 8,964,947 B1* | 2/2015 | Noolu ............... H04M 3/541 379/88.01 |
| 8,966,547 B2 | 2/2015 | Kim et al. |
| 8,990,273 B2 | 3/2015 | Iarocci et al. |
| 9,032,498 B1* | 5/2015 | Ben Ayed ............ G06F 21/35 726/9 |
| 9,148,842 B2 | 9/2015 | Qi et al. |
| 9,270,708 B2 | 2/2016 | Dave et al. |
| 9,270,760 B2 | 2/2016 | Heinberg |
| 9,380,123 B2 | 6/2016 | Linn et al. |
| 9,439,229 B2 | 9/2016 | Jung et al. |
| 9,451,438 B2 | 9/2016 | Conn et al. |
| 9,544,714 B2 | 1/2017 | Krochmal et al. |
| 9,549,375 B2 | 1/2017 | Dooley et al. |
| 10,055,567 B2 | 8/2018 | Ulrich et al. |
| 10,187,770 B2 | 1/2019 | Krochmal et al. |
| 10,193,987 B2 | 1/2019 | Linn et al. |
| 10,237,711 B2 | 3/2019 | Linn et al. |
| 2003/0110382 A1 | 6/2003 | Leporini |
| 2003/0112789 A1 | 6/2003 | Heinonen |
| 2004/0009748 A1 | 1/2004 | Heinonen |
| 2005/0076242 A1 | 4/2005 | Breuer |
| 2005/0154774 A1* | 7/2005 | Giaffreda ............ H04W 4/18 709/200 |
| 2005/0266807 A1 | 12/2005 | Goto et al. |
| 2006/0083187 A1 | 4/2006 | Dekel |
| 2006/0150240 A1 | 7/2006 | Robinson et al. |
| 2007/0054627 A1 | 3/2007 | Wormald |
| 2007/0275725 A1 | 11/2007 | Tsunehara |
| 2008/0160974 A1 | 7/2008 | Vartiainen et al. |
| 2008/0171561 A1 | 7/2008 | Irony |
| 2008/0280684 A1 | 11/2008 | McBride et al. |
| 2009/0143104 A1* | 6/2009 | Loh .................. G06Q 20/32 455/558 |
| 2010/0082784 A1 | 4/2010 | Rosenblatt et al. |
| 2011/0047388 A1 | 2/2011 | Park et al. |
| 2011/0153789 A1 | 6/2011 | Vandwalle et al. |
| 2011/0158652 A1 | 6/2011 | Friedman |
| 2011/0195665 A1 | 8/2011 | Friedlaender |
| 2011/0208825 A1 | 8/2011 | Lee et al. |
| 2011/0225640 A1 | 9/2011 | Ganapathy |
| 2011/0276619 A1* | 11/2011 | Khan .................. H04L 67/141 709/203 |
| 2011/0293095 A1 | 12/2011 | Ben Ayed |
| 2012/0003933 A1 | 1/2012 | Baker |
| 2012/0075062 A1* | 3/2012 | Osman ............... G07C 9/00087 340/5.61 |
| 2012/0096069 A1 | 4/2012 | Chan |
| 2012/0096368 A1 | 4/2012 | McDowell |
| 2012/0117400 A1 | 5/2012 | Vandwalle et al. |
| 2012/0185520 A1 | 7/2012 | Iarocci et al. |
| 2012/0210444 A1 | 8/2012 | Yabe et al. |
| 2012/0221464 A1 | 8/2012 | Pasquero et al. |
| 2012/0296982 A1 | 11/2012 | Heymen et al. |
| 2012/0296986 A1 | 11/2012 | Hassan |
| 2013/0007499 A1 | 1/2013 | Moy |
| 2013/0054720 A1 | 2/2013 | Kang et al. |
| 2013/0174100 A1* | 7/2013 | Seymour ............. G06F 3/0487 715/863 |
| 2013/0212212 A1 | 8/2013 | Addepalli et al. |
| 2013/0316644 A1 | 11/2013 | Hirabayashi et al. |
| 2013/0332846 A1 | 12/2013 | Freedman |
| 2014/0051439 A1 | 2/2014 | Brownworth |
| 2014/0068751 A1 | 3/2014 | Last |
| 2014/0078949 A1 | 3/2014 | Chu |
| 2014/0112323 A1 | 4/2014 | Qi et al. |
| 2014/0173447 A1 | 6/2014 | Das |
| 2014/0188802 A1 | 7/2014 | Branton et al. |
| 2014/0189841 A1* | 7/2014 | Metke .............. H04L 63/0815 726/9 |
| 2014/0237123 A1 | 8/2014 | Dave et al. |
| 2014/0273963 A1 | 9/2014 | Su et al. |
| 2014/0289415 A1 | 9/2014 | Chan et al. |
| 2014/0289866 A1 | 9/2014 | Beck et al. |
| 2014/0304717 A1 | 10/2014 | Kim |
| 2014/0337997 A1 | 11/2014 | Beck et al. |
| 2014/0344951 A1 | 11/2014 | Brewer |
| 2014/0361872 A1 | 12/2014 | Garcia et al. |
| 2014/0364056 A1 | 12/2014 | Belk et al. |
| 2014/0373100 A1 | 12/2014 | Poiesz |
| 2015/0012861 A1 | 1/2015 | Loginov |
| 2015/0020173 A1 | 1/2015 | Last |
| 2015/0055779 A1 | 2/2015 | Enomoto |
| 2015/0082406 A1* | 3/2015 | Park .................. H04L 63/0853 726/9 |
| 2015/0103756 A1 | 4/2015 | Sinha |
| 2015/0235030 A1 | 8/2015 | Chaiken et al. |
| 2015/0292486 A1 | 10/2015 | Zhou et al. |
| 2015/0295682 A1 | 10/2015 | Megard et al. |
| 2015/0295901 A1 | 10/2015 | Woodward et al. |
| 2015/0302188 A1 | 10/2015 | Potbhare et al. |
| 2015/0312858 A1 | 10/2015 | Kerai |
| 2015/0347738 A1 | 12/2015 | Ulrich et al. |
| 2015/0350215 A1 | 12/2015 | Shi et al. |
| 2015/0350355 A1 | 12/2015 | Linn et al. |
| 2015/0350356 A1 | 12/2015 | Linn et al. |
| 2015/0350814 A1 | 12/2015 | Krochmal et al. |
| 2015/0350865 A1 | 12/2015 | Conn et al. |
| 2015/0351038 A1 | 12/2015 | Dooley et al. |
| 2015/0373084 A1 | 12/2015 | Krochmal et al. |
| 2015/0381632 A1 | 12/2015 | Li et al. |
| 2016/0029153 A1 | 1/2016 | Linn et al. |
| 2016/0065374 A1 | 3/2016 | Sauerwald et al. |
| 2016/0227470 A1 | 8/2016 | Liu |
| 2016/0248589 A1 | 8/2016 | Potlapally et al. |
| 2016/0323272 A1* | 11/2016 | Wendling ........... G06Q 20/3572 |
| 2017/0006460 A1 | 1/2017 | Conn et al. |
| 2017/0026182 A1 | 1/2017 | Sauerwald et al. |
| 2017/0042199 A1 | 2/2017 | Stjernberg |
| 2019/0007203 A1* | 1/2019 | Bolotin .............. H04L 9/0819 |

FOREIGN PATENT DOCUMENTS

| | | |
|---|---|---|
| GB | 2418759 A | 4/2006 |
| KR | 20110123649 A | 11/2011 |
| KR | 2012-0139124 | 12/2012 |
| KR | 2013-0012061 | 1/2013 |
| KR | 2013-0027571 | 3/2013 |
| KR | 1020130124363 A | 11/2013 |
| WO | WO 2005/109829 A1 | 11/2005 |
| WO | WO 2010/089458 A1 | 8/2010 |
| WO | WO 2012/009361 A1 | 1/2012 |
| WO | WO 2015/183403 A1 | 12/2015 |
| WO | WO 2015/183414 A1 | 12/2015 |

* cited by examiner

PROXIMITY UNLOCK AND LOCK OPERATIONS FOR ELECTRONIC DEVICES

RELATED APPLICATIONS

This application is a divisional of U.S. patent application Ser. No. 14/586,528, entitled "Proximity Unlock and Lock Operations for Electronic Devices," filed on 30 Dec. 2014, now allowed, which claims priority to U.S. Provisional Application No. 62/005,758, entitled "Proximity Unlock and Lock Operations for Electronic Devices," filed on 30 May 2014, all of which are herein incorporated by reference in their entireties. The instant application is related to U.S. patent application Ser. No. 14/475,329, which was filed 2 Sep. 2014, which is titled "Operating Mode Transitions based on Advertising Information," by inventors Craig P. Dooley, Akshay Mangalam Srivatsa, Anjali S. Sandesara, and Michael J. Giles, and which is incorporated by reference in its entirety. The instant application is also related to U.S. patent application Ser. No. 14/474,466, which was filed 2 Sep. 2014, which is titled "Predefined Wireless Pairing," by inventors Jason C. Conn, Akshay Mangalam Srivatsa, Craig P. Dooley, and Michael J. Giles, and which is incorporated by reference in its entirety. The instant application is also related to pending U.S. patent application Ser. No. 14/586,566, which was filed 30 Dec. 2014, which is titled "Activity Continuation Between Electronic Devices," by Christopher S. Linn, Keith Stattenfield, Christopher C. Jensen, Alexander R. Ledwith, David A. Carter, Marc J. Krochmal, John J. Iarocci, and Jonathan M. Grynspan, and which is incorporated by reference in its entirety. The instant application is also related to U.S. patent application Ser. No. 14/586,511, which was filed 30 Dec. 2014, which is titled "Companion Application for Activity Cooperation," by Marc J. Krochmal, Christopher S. Linn, John J. Iarocci, Geoffrey Stahl, and Jacques P. Gasselin de Richebourg, and which is incorporated by reference in its entirety.

BACKGROUND

Field

The disclosed embodiments relate to electronic devices. More specifically, the disclosed embodiments relate to a proximity unlock operation for electronic devices.

Related Art

Many modern electronic devices (e.g., desktop computers, laptop computers, smart phones, etc.) enable a user to transition the electronic device from an unlocked operating state, in which a user has normal access to the electronic device's functions, to a locked operating state, in which the user has restricted access to various functions of the electronic device. For example, in the locked operating state, some electronic devices present a lock screen on a display of the electronic device and block users from virtually all of the functions of the electronic device, so that the user is unable to access application programs that run on the electronic device and/or use electronic device features such a cellular phone, a camera, etc. By placing an electronic device in the locked operating state, a user is able to secure sensitive files stored on the electronic device, prevent unauthorized access to the electronic device (and possibly to other devices on networks to which the electronic device is connected), etc. However, transitioning from the locked operating state to the unlocked operating state can be inconvenient because the user is required to perform a manual authentication operation to cause the transition. For example, the user can be required to enter a password in a password entry dialog presented on a display of the electronic device, scan a fingerprint using a fingerprint scanner, perform a voice unlock, etc. This inconvenience may cause users to be less inclined to place the electronic device in the locked operating state, which means that the electronic device is less secure and more exposed to unauthorized use.

BRIEF DESCRIPTION OF THE FIGURES

In the figures, like reference numerals refer to the same figure elements.

DETAILED DESCRIPTION

Figure 1:
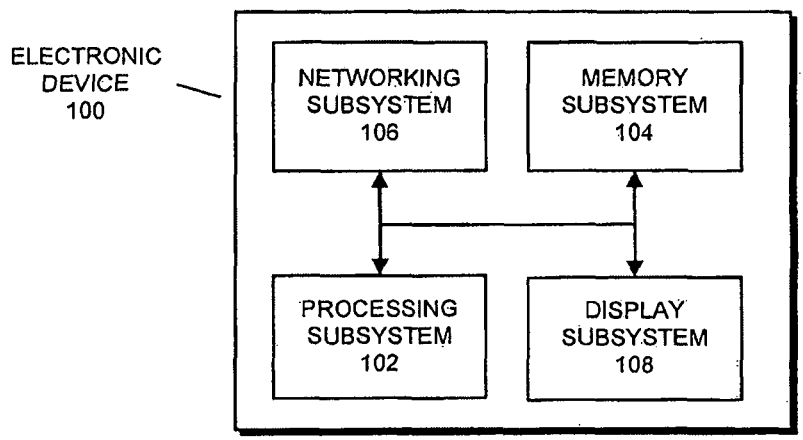
FIG. 1 presents a block diagram illustrating an electronic device in accordance with some embodiments.

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

In some embodiments, an electronic device (e.g., electronic device 100 in FIG. 1 and/or some portion thereof) uses code and/or data stored on a computer-readable storage medium to perform some or all of the operations herein described. More specifically, the electronic device reads the code and/or data from the computer-readable storage medium and executes the code and/or uses the data when performing the described operations. In these embodiments, a computer-readable storage medium can be any device or medium or combination thereof that stores code and/or data for use by an electronic device. For example, the computer-readable storage medium can include, but is not limited to, volatile memory or non-volatile memory, such as semiconductor memories (e.g., flash memory, random access memory (eDRAM, RAM, SRAM, DRAM, DDR, DDR2/DDR3/DDR4 SDRAM, etc.), etc.) and/or magnetic or optical storage mediums (e.g., disk drives, magnetic tape, CDs, DVDs). In the described embodiments, the computer-readable storage medium does not include non-statutory computer-readable storage mediums such as transitory signals.

In some embodiments, one or more hardware modules are configured to perform the operations herein described. For example, the hardware modules can comprise, but are not limited to, one or more processors/cores/central processing units (CPUs), application-specific integrated circuit (ASIC) chips, field-programmable gate arrays (FPGAs), caches/cache controllers, memory management units, compute units, embedded processors, graphics processors (GPUs)/graphics cores, pipelines, and/or other programmable-logic devices. When such hardware modules are activated, the hardware modules perform some or all of the operations. In some embodiments, the hardware modules include one or more general-purpose circuits that are configured by executing instructions (program code, firmware, etc.) to perform the operations.

In this description, functional blocks may be referred to in describing some embodiments. Generally, functional blocks include one or more interrelated circuits that perform the described operations. In some embodiments, the circuits in a functional block include circuits that execute program code (e.g., microcode, firmware, applications, etc.) to perform the described operations.

Overview

In the described embodiments, electronic devices perform a proximity unlock operation. For the proximity unlock operation, a first electronic device in a locked operating state detects that an authorized second electronic device is in proximity to the first electronic device. Based on the detecting that the authorized second electronic device is in proximity to the first electronic device, the first electronic device transitions from a locked operating state to an unlocked operating state. In these embodiments, the transition to the unlocked operating state occurs without the user performing a manual authentication step on the first electronic device to cause the transition (i.e., a manual authentication step that is performed in existing electronic devices).

In some embodiments, detecting that the second electronic device is in proximity to the first electronic device includes the first electronic device broadcasting an advertisement message using a wireless network interface (e.g., Bluetooth low energy (BLE), ZigBee, etc.). The second electronic device monitors for such advertisement messages and, upon detecting the broadcast advertisement message, responds by sending the first electronic device a connection request message that comprises a connection request (i.e., a request to form a wireless network connection with the first electronic device). The first electronic device then determines, based on information from the connection request, that the second electronic device is in proximity to the first electronic device.

In some embodiments, before transitioning from the locked operating state to the unlocked operating state based on the connection request, the first electronic device performs one or more operations for approving the connection request. For example, in some embodiments, the information from the connection request is encrypted and the first electronic device decrypts the information using a key acquired during a preliminary pairing operation between the first electronic device and the second electronic device (e.g., a "cloud pairing" operation, as described below). As another example, in some embodiments, the first electronic device compares information from the connection request (e.g., a device identifier) to a record of authorized devices to determine that there is a match between the information from the connection request and a device in the record of authorized devices. As another example, in some embodiments, in addition to the above-described operations, the first electronic device can verify that one or more secondary authentication procedures have been completed successfully. For example, the secondary authentication procedures can include a voice and/or fingerprint scan by an authorized user on one of the first or second electronic devices, a verified image capture by the first electronic device (via a camera coupled to the first electronic device) of an authorized user, entry of a password or code on the first or second electronic devices, etc. As another example, in some embodiments, the secondary authentication procedures can include a verification that the second electronic device is within a threshold distance of the first electronic device (e.g., within N feet, where N is 10, 50, or another number).

In some embodiments, the first electronic device also supports a proximity lock operation. Generally, in these embodiments, a first electronic device that was transitioned to the unlocked operating state using a proximity unlock operation monitors for the continued proximity/presence of the second electronic device (i.e., the device that enabled the proximity unlock operation). When the first electronic device can no longer detect the second electronic device in proximity to the first electronic device, the first electronic device transitions from the unlocked operating state to the locked operating state. In these embodiments, the transition to the locked operating state occurs without the user performing a manual locking step to cause the transition (i.e., a manual locking step that is performed in existing electronic devices).

By performing the proximity unlock and lock operations as described, the described embodiments enable users to avoid performing a manual authentication step and a manual locking step to initiate transitions from a locked operating state to an unlocked operating state and from the unlocked operating state to a locked operating state, respectively. This increases user satisfaction with the user experience of the electronic device and encourages users to place the electronic device in the locked operating state (thereby securing the device/connected devices, files, etc.).

Electronic Device

FIG. 1 presents a block diagram illustrating electronic device 100 in accordance with some embodiments. Electronic device 100 includes processing subsystem 102, memory subsystem 104, networking subsystem 106, and display subsystem 108.

Processing subsystem 102 is a functional block that performs computational operations in electronic device 100. Processing subsystem 102 includes one or more central processing units (CPUs)/CPU cores, graphics processing units (GPUs)/GPU cores, embedded processors, application specific integrated circuits (ASICs), and/or other computational mechanisms.

Memory subsystem 104 is a functional block that stores data and/or instructions for use by other functional blocks in electronic device 100 (e.g., processing subsystem 102, etc.). Memory subsystem 104 includes volatile memory circuits such as dynamic random access memory (DRAM), static random access memory (SRAM), and/or other types of memory that are used for storing the instructions and data, as well as mechanisms for controlling the memory circuits. In some embodiments, memory subsystem 104 includes a memory hierarchy with one or more caches coupled to the memory circuits. In some of these embodiments, processing subsystem 102 also includes one or more caches that are part of the memory hierarchy.

In some embodiments, memory subsystem 104 is coupled to one or more non-volatile high-capacity mass-storage devices (not shown). For example, memory subsystem 104 can be coupled to a magnetic or optical drive, a solid-state drive, or another type of mass-storage device. In these embodiments, memory subsystem 104 can be used by electronic device 100 as fast-access storage for often-used data, while the mass-storage device is used to store less frequently used data.

Networking subsystem 106 is a functional block that includes one or more devices configured to couple to and communicate on a wired and/or wireless network (i.e., to perform network operations). For example, networking subsystem 106 can include a Bluetooth™ networking system, a cellular networking system (e.g., a 3G/4G network such as UMTS, LTE, etc.), a universal serial bus (USB) networking system, a networking system based on the standards described in IEEE 802.11, 802.15, etc. (e.g., a ZigBee or WiFi networking system, etc.), an Ethernet networking system, and/or another networking system. Networking subsystem 106 includes processors, controllers, radios/antennas, sockets/plugs, and/or other devices used for coupling to, communicating on, and handling data and events for each supported networking system. In the following description, the mechanisms used for coupling to, communicating on, and handling data and events on the network for each network system are referred to collectively as the "interface" or "network interface" for the network system.

Display subsystem 108 is a functional block that includes one or more devices configured to display information on a visual interface for electronic device 100. For example, in some embodiments, display subsystem 108 includes graphics processors (GPUs), graphics cards, and/or display screens that are used for displaying the information.

In some embodiments, communication paths (that include one or more buses, wires, and/or connections) are coupled between the functional blocks in electronic device 100 (processing subsystem 102, memory subsystem 104, etc.), as shown by arrow-headed lines between the elements. The communication paths are used to transmit commands, data, and/or other information between the elements.

Although specific components are used to describe electronic device 100, in some embodiments, different components and/or subsystems may be present in electronic device 100. For example, electronic device 100 may include one or more additional processing subsystems 102, memory subsystems 104, etc. Additionally, one or more of the subsystems may not be present in electronic device 100 or some or all of the subsystem's functions may be incorporated the other subsystems. Moreover, in some embodiments, electronic device 100 may include one or more additional subsystems that are not shown in FIG. 1. For example, electronic device 100 can include, but is not limited to, a data collection subsystem, an audio and/or video subsystem, an alarm subsystem, a media processing subsystem, and/or an input/output (I/O) subsystem.

Electronic device 100 can be, or can be included in, any device that performs computational operations. For example, electronic device 100 can be, or can be included in, a desktop computer, a laptop computer, a wearable computing device, a tablet computer, a smart phone, a server, a network appliance, a toy, audio-visual equipment, a set-top box (e.g., an Apple TV from Apple, Inc. of Cupertino Calif.), an automobile (e.g., an interface system in an automobile), a home appliance, a controller, etc., and/or combinations thereof.

Network Environment

Figure 2:
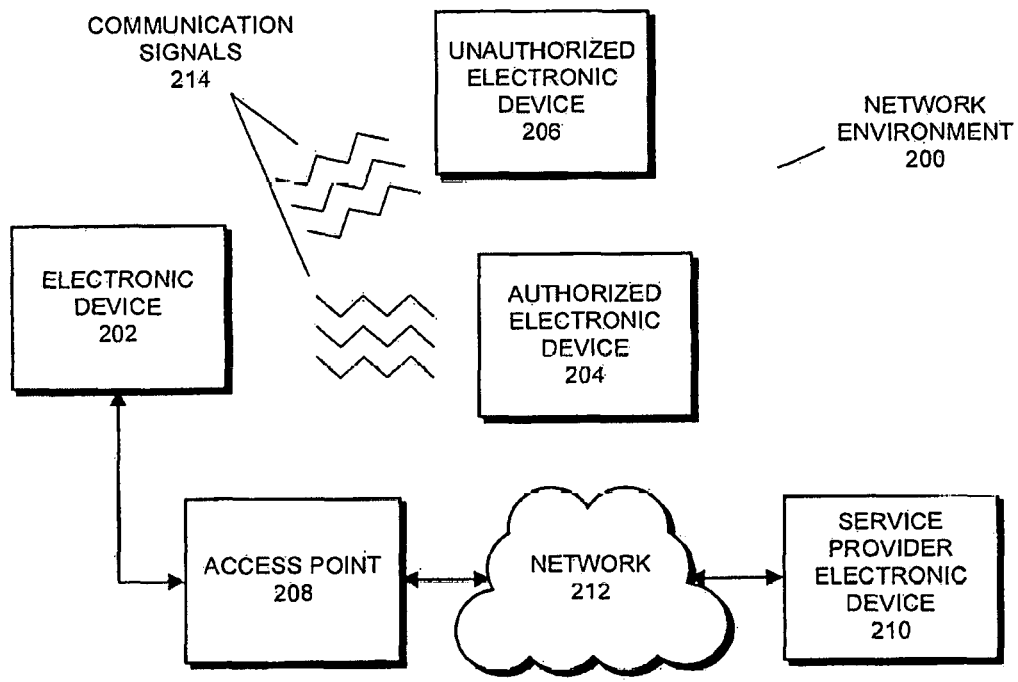
FIG. 2 presents a block diagram illustrating a network environment in accordance with some embodiments.

FIG. 2 presents a block diagram illustrating network environment 200 in accordance with some embodiments. As can be seen in FIG. 2, network environment 200 includes electronic device 202, authorized electronic device 204, unauthorized electronic device 206, and service provider electronic device 210 (which may be referred to collectively as "the electronic devices"), as well as access point 208 and network 212. In some embodiments, each of the electronic devices (and possibly access point 208) is an electronic device similar to electronic device 100, i.e., has similar subsystems to electronic device 100. However, this is not required; the described embodiments can use any electronic devices that can perform the operations herein described.

In some embodiments, electronic device 202 is an electronic device that supports a locked operating state and an unlocked operating state. In the locked operating state, one or more functions of electronic device 202 are disabled. For example, in the locked operating state, a lock screen may be presented when a user activates electronic device 202 (e.g., presses a button on a keyboard of electronic device 202, touches a touch-sensitive display of electronic device 202, etc.), but the user may be unable to access home screens/a desktop presented on a display of electronic device 202, access some or all application programs provided by electronic device 202, access some or all files stored in electronic device 202, access functions performed by electronic device 202 (e.g., cellular telephone functions, camera functions, etc.), and/or otherwise interact with electronic device 202. In the unlocked operating state, the above-described one or more functions of electronic device 202 are enabled. For example, the user may be able to access home screens/the desktop, etc. As described herein, when in the locked operating state, electronic device 202 can be transitioned to the unlocked operating state by performing a proximity unlock operation. In addition, when in the unlocked operating state after the proximity unlock operation, electronic device 202 can be transitioned to the locked operating state by performing a proximity lock operation.

Authorized electronic device 204 and unauthorized electronic device 206 are electronic devices that participate in exchanges of communications with electronic device 202 relating to proximity unlock operations and/or proximity lock operations. In some embodiments, "authorized" electronic device 204 is an electronic device that is "recognized" by electronic device 202 and is therefore allowed to enable the proximity unlock operation. For example, electronic device 202 and authorized electronic device 204 may participate in a device-to-device exchange of identification factors (encryption keys, device information, etc.) so that electronic device 202 and authorized electronic device 204 subsequently recognize each other based on communications between the devices. In some embodiments, for the device-to-device exchange, electronic device 202 and authorized electronic device 204 perform, based on a login to an account with service provider electronic device 210, a preliminary pairing operation to establish/exchange keys and other information (the preliminary pairing operation, which may also be called "cloud pairing," is described in more detail below). In addition, in some embodiments, a user may configure electronic device 202 to recognize authorized electronic device 204 as described herein. In contrast, "unauthorized" electronic device 206 is an electronic device that is not recognized by electronic device 202 and therefore is not authorized to enable the proximity unlock operation. For example, electronic device 202 and unauthorized electronic device 206 may be generally unknown to each other (belong to different users, be associated with different user accounts, not yet have performed the preliminary pairing operation, etc.).

Access point 208 is an electronic device that provides a wireless local-area network (WLAN) (e.g., a WiFi network) that electronic device 202 is able to join. In some embodiments, one or both of authorized electronic device 204 and unauthorized electronic device 206 are also able to join the WLAN and may therefore be able to communicate with electronic device 202 via the WLAN. In some embodiments, access point 208 is coupled to a wide area network (WAN) 212 (e.g., the Internet) and provides access to network 212 to electronic devices coupled to the WLAN.

Service provider electronic device 210 is an electronic device such as an authentication server, a login server, an account access server, etc. that is operated by a service provider (e.g., a corporation, etc.) to host/provide account services for user devices. In some embodiments, service provider electronic device 210 facilitates the exchange of information enabling electronic devices (e.g., electronic device 202 and authorized electronic device 204) to recognize each other, thereby enabling these electronic devices to participate in a proximity unlock operation. For example, in some embodiments, service provider electronic device 210 facilitates the preliminary pairing operation herein described. As shown in FIG. 2, in some embodiments, service provider electronic device 210 is located on the Internet—i.e., is a "cloud" based device that provides the above-described services via dedicated applications, web interfaces, etc.

Within network environment 200, electronic device 202 can communicate with authorized electronic device 204 and unauthorized electronic device 206 using wireless communication signals 214 (illustrated using jagged lines in FIG. 2). Generally, communication signals 214 are radio signals that are formatted (i.e., header and payload content, etc.) and exchanged (broadcast, transmitted/received, etc. at corresponding frequencies, power levels, times, etc.) in accordance with a corresponding wireless protocol. For example, the wireless protocol may be Bluetooth, ZigBee, and/or another wireless protocol. In the following description, when various messages are described as being broadcast, transmitted, sent, received, etc., by electronic devices, the messages may be broadcast, transmitted, sent, received, etc. using communication signals 214. Note that, although the communication path between access point 208 and electronic device 202 is indicated by a double-headed arrow in FIG. 2, access point 208 and electronic device 202 may also use corresponding wireless communication signals to communicate with one another.

In some embodiments, the above-described proximity unlock and lock operations rely on electronic device 202 and authorized electronic device 204 being sufficiently close to each other to enable communication signals 214 (and thus the incorporated messages) sent by each electronic device to be received by the other electronic device. In other words, electronic device 202 and authorized electronic device 204 are in "proximity" to one another, thereby enabling the exchange of messages between the electronic devices. "Proximity" as used herein therefore represents distance(s) at which messages broadcast/sent from a given electronic device can be received by one or more other electronic devices. This distance is dictated by radio equipment (antennas, receivers/transmitters, etc.) in the electronic devices and the particular radio protocol/signals used to broadcast/send the messages, as limited by factors such as environmental conditions (electromagnetic interference, etc.), intermediate objects (furniture, walls, clothing/bags, etc.), etc. For example, in some embodiments, communication signals 214 are exchanged between electronic device 202 and authorized electronic device 204 using a protocol with an expected range of 30 meters, and thus the devices are "in proximity" when the devices are within 30 meters of one another (note, however, that the expected range may be significantly altered by the above-described factors).

Figure 10:
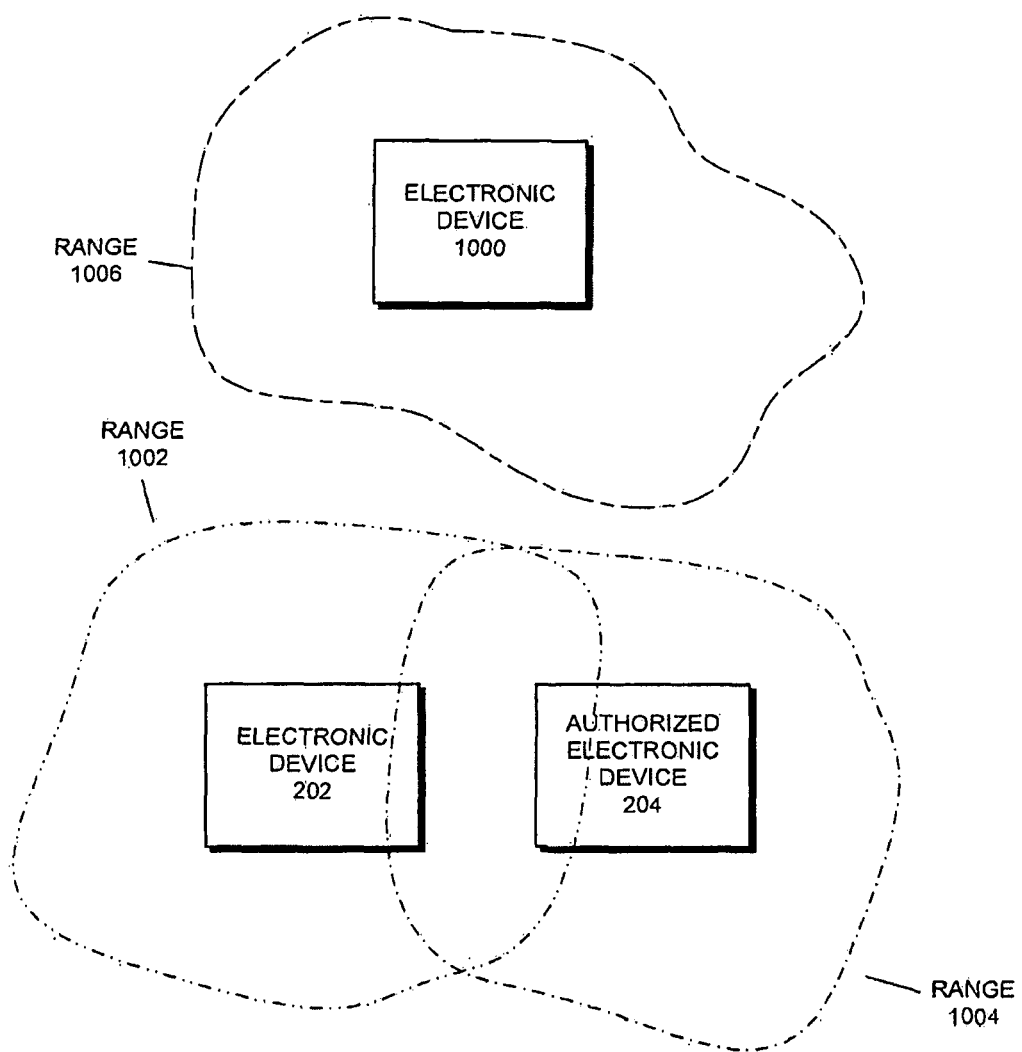
FIG. 10 presents a block diagram illustrating electronic devices in proximity to one another in accordance with some embodiments.

FIG. 10 presents a block diagram illustrating electronic devices in proximity to one another in accordance with some embodiments. As can be seen in FIG. 10, authorized electronic device 204 is within range 1002 for radio signals (e.g., communication signals 214) for electronic device 202, meaning that authorized electronic device 204 can receive radio signals sent from electronic device 202. In addition, electronic device 202 is within range 1004 for radio signals (e.g., communication signals 214) for authorized electronic device 204, meaning that electronic device 202 can receive radio signals sent from authorized electronic device 204. As described above, therefore, electronic device 202 and authorized electronic device 204 are "in proximity" to one another, thereby enabling the communication of messages (and corresponding operations) herein described. However, neither electronic device 202 nor authorized electronic device 204 is within range 1006 for radio signals for electronic device 1000, meaning that neither electronic device 202 nor authorized electronic device 204 is in proximity to electronic device 1000. Note that ranges 1002-1006 in FIG. 10 are shown using irregular shapes, thereby illustrating that radio signals from the electronic devices have irregular ranges, depending on the electronic device (antenna arrangement, etc.), the above-described factors, etc.

As described below, in some embodiments, the electronic devices include mechanisms for determining whether another electronic device is within a threshold distance of the electronic devices. For example, a given electronic device may use a radio signal property (e.g., signal strength, frequency, timing, etc.) of a radio signal (compared to previously-known signal properties) used to transmit a message, etc. In these embodiments, one or more operations may depend not only on being in proximity to one another (e.g., within ranges 1002 and 1004), but also on being within prescribed distances from one another.

Although various electronic devices are shown in FIG. 2, in some embodiments different arrangements of electronic devices are used to perform some or all of the operations herein described. For example, in some embodiments, one or more of access point 208, service provider electronic device 210, and unauthorized electronic device 206 are not present. Generally, the described embodiments include sufficient devices to transition electronic device 202 from the locked operating state to the unlocked operating state (and back) as described herein.

Acquisition of Pairing Information

In some embodiments, electronic devices that are party to a proximity unlock operation and/or proximity lock operation perform one or more operations to acquire pairing information such as encryption keys, device information, network details, etc. The pairing information is subsequently used to enable communications between the electronic devices using a corresponding network protocol (e.g., a Bluetooth protocol, a Zigbee protocol, etc.) and/or to verify that the devices recognize each other (e.g., via encrypting messages, etc.). In some embodiments, the operations performed to acquire the pairing information are performed via network 212 and/or communication signals 214 and are interchangeably referred to herein as preliminary pairing, predefined pairing, or "cloud pairing." For example, in some embodiments, the electronic device performs the predefined pairing operation that is described in pending U.S. patent application Ser. No. 14/474,466, which was filed on the same day as the instant application, which is titled "Predefined Wireless Pairing," by inventors Jason C. Conn, Akshay Nilangalam Srivatsa, Craig P. Dooley, and Michael Giles, which is incorporated by reference as described above.

Figure 3:
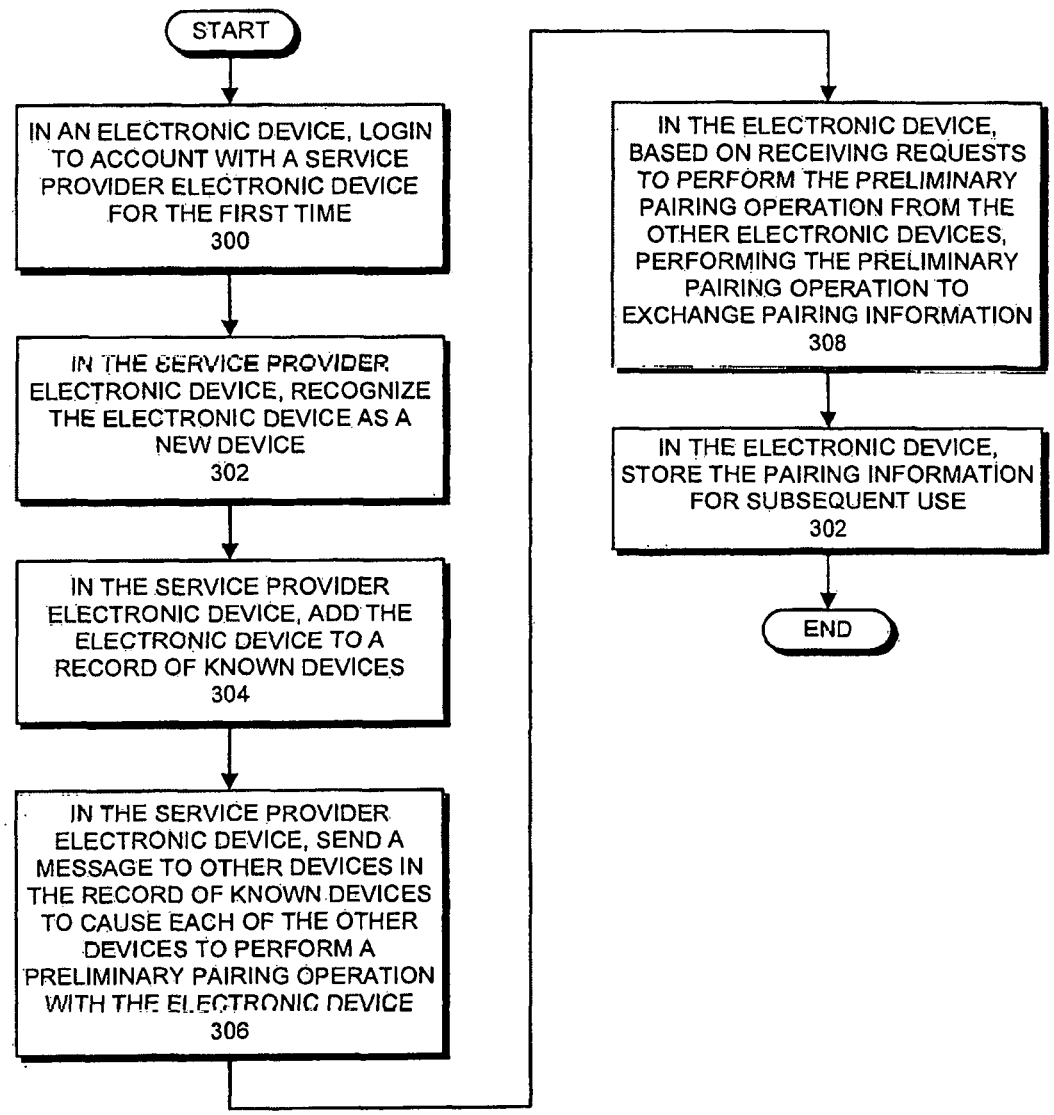
FIG. 3 presents a flowchart illustrating a process for acquiring pairing information in accordance with some embodiments.

FIG. 3 presents a flowchart illustrating a process for acquiring pairing information in accordance with some embodiments. More specifically, during the process shown in FIG. 3, electronic device 202, which is associated with a user account, communicates with service provider electronic device 210 and other electronic devices associated with the user account (e.g., authorized electronic device 204) to acquire the pairing information. Note that the operations shown in FIG. 3 are presented as a general example of operations performed by some embodiments. The operations performed by other embodiments include different operations and/or operations that are performed in a different order. Additionally, although certain mechanisms are used in describing the operations (e.g., electronic device 202, service provider electronic device 210, etc.), in some embodiments, other mechanisms perform the operations. For example, authorized electronic device 204 may perform similar operations to acquire pairing information for communicating with electronic device 202 (instead of electronic device 202 performing the operations).

Note that, for the example in FIG. 3, electronic device 202 is assumed to be logging into an account with service provider electronic device 210 for the first time. Thus, service provider electronic device 210 recognizes electronic device 202 as a "new" device for the account. However although the operations are described as taking place during a first login, in some embodiments, the process takes place during a different login. In addition, it is assumed that authorized electronic device 204 has already logged in to the account with service provider electronic device 210 and is therefore a device that is associated with the account by service provider electronic device 210.

The process shown in FIG. 3 starts when electronic device 202 is logged in to an account with a service provider via service provider electronic device 210 for the first time (step 300). For example, a user of electronic device 202 can access and log in to the account using an application program that is configured to communicate with service provider electronic device 210 (e.g., an online store application program, a configuration application program, etc.). As another example, the user of electronic device 202 can access and log in to the account via a web page provided by the service provider electronic device 210.

Upon electronic device 202 logging in to the account, service provider electronic device 210 recognizes electronic device 202 as a new device (step 302). For example, service provider electronic device 210 can acquire device information such as a unique identifier, a MAC address, etc. from electronic device 202, compare the acquired information to a record of known electronic devices, and determine that electronic device 202 is as-yet unknown to service provider electronic device 210 (and thus is a new device). Service provider electronic device 210 then adds electronic device 202 to a record of known devices (step 304).

In addition to adding electronic device 202 to the record of known devices, service provider electronic device 210 sends a message to other devices in the record of known devices to cause each other device to perform a preliminary pairing operation with electronic device 202 (step 306). Recall that authorized electronic device 204 has been associated with the account by service provider electronic device 210 and is therefore in the record of known devices, and thus one of the messages is sent to authorized electronic device 204. During the preliminary pairing operation, the above described pairing information, which is generally information used to perform communication between the electronic devices using a corresponding network protocol and to enable the electronic devices to recognize one another, is exchanged between electronic device 202 and authorized electronic device 204 (step 308). In some embodiments, the pairing information exchanged during the preliminary pairing operation includes information such as one or more of the public address of each of electronic device 202 and authorized electronic device 204, the protocol version of a network interface to be used to communicate between electronic device 202 and authorized electronic device 204, desired pairing encryption and/or identification keys (which are sometimes referred to as 'pairing keys'), the desired long-term encryption-key LTK length (which is sometimes referred to as a 'key length'), human-readable device names, device identifiers (UUIDs, MAC addresses, etc.) and/or other information.

Electronic device 202 and each other device (e.g., authorized electronic device 204) then store the pairing information for subsequent use as described herein (step 310).

Configuring Devices

Figure 4:
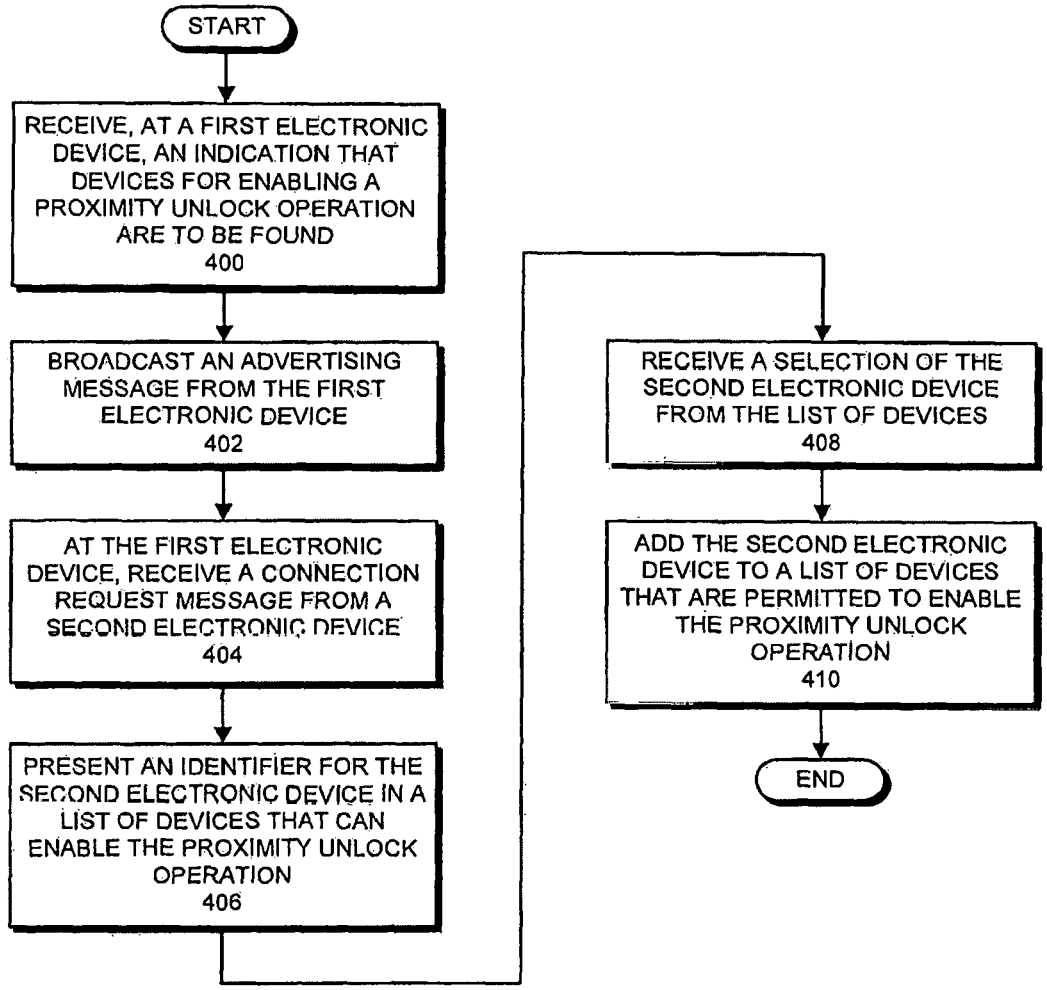
FIG. 4 presents a flowchart illustrating a process for configuring electronic devices to participate in the proximity unlock operation in accordance with some embodiments.

In some embodiments, in order to enable the proximity unlock operation, one or more of the electronic devices that participate in the proximity unlock operation are first configured. FIG. 4 presents a flowchart illustrating a process for configuring electronic devices to participate in the proximity unlock operation in accordance with some embodiments. More specifically, during the process shown in FIG. 4, electronic device 202 communicates with authorized electronic device 204 to configure electronic device 202 so that authorized electronic device 204 can enable the proximity unlock operation. Note that the operations shown in FIG. 4 are presented as a general example of operations performed by some embodiments. The operations performed by other embodiments include different operations and/or operations that are performed in a different order. Additionally, although certain mechanisms are used in describing the operations (e.g., electronic device 202, authorized electronic device 204, etc.), in some embodiments, other electronic devices perform the operations.

In some embodiments, electronic device 202 is a laptop computer and authorized electronic device 204 is a device such as a smart phone or a wearable computing device. Thus, for the operations described below, a user may access a configuration interface on the user's laptop and may configure the laptop to permit the smart phone/wearable computing device to enable the proximity unlock operation.

The operations shown in FIG. 4 start when electronic device 202 receives an indication that devices for enabling a proximity unlock operation are to be found (step 400). For example, in some embodiments, this operation includes a user accessing a configuration interface provided by electronic device 202 and selecting/enabling a corresponding configuration operation. For example, the user may select a specified icon that is presented on a display screen of electronic device 202 (such as by locating a mouse pointer over a "settings" icon and clicking to select, by finger-tapping a "settings" icon on a touch-sensitive display, etc.), which causes the laptop to display a settings interface with various menu items, icons, etc. for accessing corresponding control interfaces for the laptop (e.g., wireless network controls, application-specific controls, etc.) From the settings interface, the user can select an icon, choose a menu item, etc. to cause electronic device 202 to display the configuration interface, which is a display window/screen that includes various control options (clickable option buttons/sliders, etc.) for controlling the proximity unlock/lock operation herein described.

Electronic device 202 then broadcasts an advertisement message requesting the proximity unlock operation service (step 402). For example, electronic device 202 may send an advertisement message that includes data (service identifiers, request flags, header or payload fields, etc.) that indicate that the advertisement message is requesting responses from devices that provide a proximity unlock operation service. In some embodiments, some or all of the information in the advertisement message is encrypted using a corresponding key from the pairing information. In this way, it can be known that the devices recognize each other (as the devices participated in the above-described preliminary pairing operation).

In response to the request, electronic device 202 receives, from authorized electronic device 204, a connection request message (step 404). The connection request includes data (service identifiers, response flags, etc.) that indicate that the connection response is from a device that provides the proximity unlock operation service. In some embodiments, some or all of the information in the connection response message is encrypted using a corresponding key from the pairing information. Thus, authorized electronic device 204 may decrypt the information in the advertising message using a corresponding key to determine that authorized electronic device 204 is authorized to participate in the proximity unlock operation before sending the connection request.

Electronic device 202 processes the data from the connection request message and determines that authorized electronic device 204 provides the proximity unlock operation service. For example, electronic device 202 may decrypt the information in the connection request message using a corresponding key and process the decrypted information from the connection request message to determine that authorized electronic device 204 provides the proximity unlock operation service. In some embodiments, electronic device 202 also performs one or more operations to verify/authenticate authorized electronic device 204 with service provider electronic device 210 and/or another third-party electronic device.

Electronic device 202 next presents an identifier for authorized electronic device 204 in a list of devices that can enable the proximity unlock operation (step 406). For example, electronic device 202 may present, in the configuration interface, the list of devices including a human-readable name for authorized electronic device 204 (e.g., "Susan's Smartphone," "Bob's Smartwatch," etc.) that was retrieved from the connection request, the pairing information, or elsewhere. Electronic device 202 then receives a selection of authorized electronic device 204 from the list of devices (step 408). For example, a user may mouse-over and click a device identifier for authorized electronic device 204 in the list of devices in the configuration interface, select authorized electronic device 204 in the list of devices and click an enter button in the configuration interface, etc. In some embodiments, after receiving the selection of authorized electronic device 204, electronic device 202 halts the broadcasting of advertisement messages.

Electronic device 202 then adds the selected authorized electronic device 204 to a list of devices that are permitted to enable the proximity unlock operation (step 410). For example, electronic device 202 can acquire information (e.g., a device identifier, a MAC address, a human-readable name, etc.) from the connection request message, the pairing information, etc., and add the acquired information to the list, the information configured to enable the subsequent identification of authorized electronic device 204 as being permitted to enable the proximity unlock operation.

Although an embodiment is described where only one advertisement message is broadcast, in some embodiments, multiple advertisement messages may be sent. For example, in some embodiments, electronic device 202 advertises for a predetermined length of time such as M seconds (where M is a number such as 10, 30, etc.) by periodically sending advertisement messages and then monitoring for responses to each message for a certain time. If no electronic devices respond in the predetermined length of time, electronic device 202 halts the search and, in some embodiments, informs the user of the failure to find any electronic device that provides the proximity unlock operation service.

In addition, although an embodiment is described where only authorized electronic device 204 responds to the broadcast advertisement message, in some embodiments, two or more devices respond to the advertisement messages. In these embodiments, the list of devices presented in operation 406 includes an identifier for each responding device and the selection received is for one or more of the responding devices.

Proximity Unlock Operation

Figure 5:
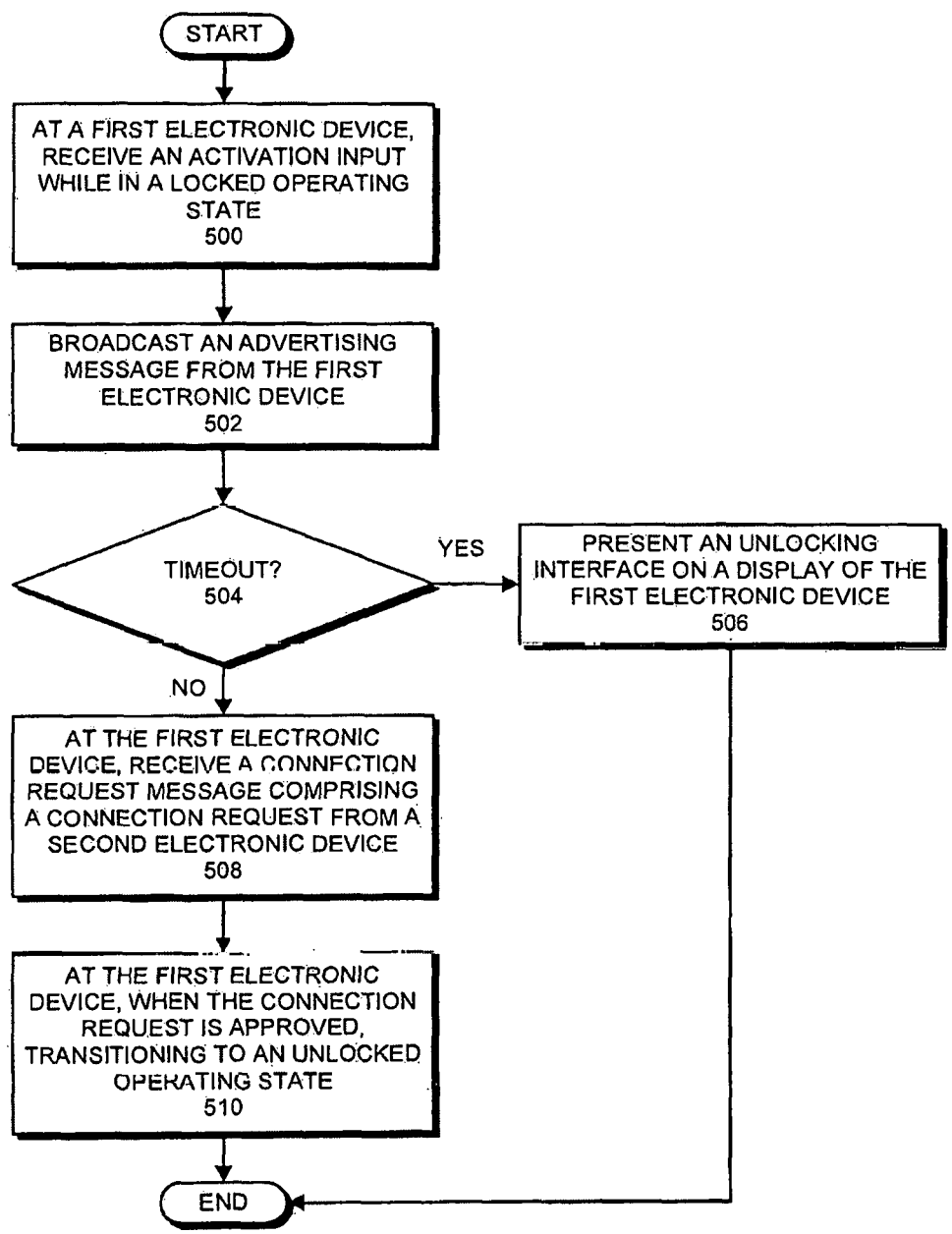
FIG. 5 presents a flowchart illustrating a process for a proximity unlock operation in accordance with some embodiments.

As described above, in the described embodiments, electronic device 202 and authorized electronic device 204 perform a proximity unlock operation to transition electronic device 202 from a locked operating state to an unlocked operating state. FIG. 5 presents a flowchart illustrating a process for a proximity unlock operation in accordance with some embodiments. More specifically, during the process shown in FIG. 5, electronic device 202 communicates with authorized electronic device 204 to enable a proximity unlock operation. Note that the operations shown in FIG. 5 are presented as a general example of operations performed by some embodiments. The operations performed by other embodiments include different operations and/or operations that are performed in a different order. Additionally, although certain mechanisms are used in describing the operations (e.g., electronic device 202, authorized electronic device 204, etc.), in some embodiments, other electronic devices perform the operations.

In some embodiments, electronic device 202 is a laptop computer, authorized electronic device 204 is a smart phone, and unauthorized electronic device 206 is a wearable electronic device (e.g., smart watch, head-mounted electronic device, etc.). Thus, for the operations described below, the laptop may be in an area (e.g., a room) in a locked operating state. A first user carrying authorized electronic device 204/the smart phone may enter the area in which the locked laptop is located and initiate the proximity unlock operation (e.g., press a key on the locked laptop). In addition, a second user that is wearing the unauthorized electronic device 206/the wearable electronic device may be in the area. The locked laptop may communicate with the smart phone of the first user to enable the proximity unlock operation—during which the laptop is automatically unlocked. However, the laptop may ignore communications from the second user's (unauthorized) wearable electronic device relating to the broadcast advertisement message for the proximity unlock operation because the wearable electronic device is unauthorized.

The process shown in FIG. 5 starts with electronic device 202 in a locked operating state. Recall that, in the locked operating state, one or more functions of electronic device 202 are disabled (blocked from access, turned off, etc.). While in the locked operating state, electronic device 202 receives an activation input from a user (step 500). The activation input is received via one or more input devices for electronic device 202. For example, a user can press a key on a keyboard of electronic device 202, swipe a touch-sensitive screen or entry device on/coupled to electronic device 202, speak a given command to the electronic device 202, move an input device such as a mouse coupled to electronic device 202, and/or perform another operation to enter the activation input.

Based on receiving the activation input, electronic device 202 initiates the proximity unlock operation by generating and broadcasting an advertisement message (step 502). In some embodiments, the advertisement message generated by electronic device 202 includes an indication that electronic device 202 is searching for electronic devices that provide a proximity unlock operation service. In these embodiments, the indication may be included in an encoded format such as being represented by one or more bits being set to predetermined values in a particular portion of a header and/or payload of the advertisement message to indicate that the proximity unlock operation service is the service that is being searched for. In some embodiments, the advertisement message is encrypted using the above-described encryption key from the pairing information.

In some embodiments, electronic device 202 uses a low-power protocol such as Bluetooth low-energy (BLE), ZigBee, etc. to broadcast the advertisement message with corresponding communication signals 214. The advertisement message is formatted and handled in accordance with the underlying protocol (e.g., limited to a corresponding number of bits/bytes, broadcast on a particular schedule, etc.). Devices such as authorized electronic device 204, etc. may therefore monitor for advertisement messages broadcast from electronic device 202 using corresponding low-power mechanisms such as baseband processors within a corresponding network interfaces. In some embodiments, the initial communications between electronic device 202 and an electronic device such as authorized electronic device 204 are handled by authorized electronic device 204 using only the baseband processor, which means that authorized electronic device 204 may otherwise be in an idle state (e.g., with subsystems such as the processing subsystem in a low-power state). For example, in some embodiments, authorized electronic device 204 may be a smart phone in a user's pocket in the idle state in which a baseband processor monitors for advertisement messages while the processing subsystem (and authorized electronic device 204 generally) is in low-power state. In some embodiments, upon recognizing the advertisement message as such, the baseband processor wakes the processing subsystem (and may generally transition authorized electronic device 204 out of the idle operating state to a higher-power/more active operating state) to perform subsequent operations. For example, in some embodiments, authorized electronic device 204 monitors for advertisements and reacts to received advertisements as is described in pending U.S. patent application Ser. No. 14/475,329, which was filed on the same day as the instant application, which is titled "Operating Mode Transitions based on Advertising Information," by inventors Craig P. Dooley, Akshay Mangalam Srivatsa., Anjali S. Sandesara, and Michael. Giles, which is incorporated by reference as described above. In these embodiments, authorized electronic device 204/the smart phone may not need to be retrieved from the user's pocket and/or activated to perform authorized electronic device 204/the smart phone's portion of the proximity unlock operation.

In some embodiments, electronic device 202 is configured to perform the search for electronic devices that support the proximity unlock operation service for a predetermined time and, if no such electronic devices are found, halt the search. For example, in some embodiments, upon receiving the activation input, electronic device 202 starts a timer. If a timeout occurs (e.g., if the timer expires) before a connection request message is received from another electronic device (step 504), electronic device 202 presents an unlocking interface on a display of electronic device 202 (step 506). The unlocking interface is an interface that is presented to enable a user to perform a manual authentication step to cause electronic device 202 to transition to the unlocked operating state from the locked operating state. For example, the user can be required to enter a password in a password entry dialog presented on a display of the device, scan a fingerprint using a fingerprint scanner, perform a voice unlock, etc.

In some embodiments, electronic device 202 does not wait for the timeout period (step 504), but instead presents the unlocking interface on the display screen of electronic device 202 as soon as the activation input is received. In this way, electronic device 202 enables the user to perform the manual authentication step immediately (i.e., perhaps before the proximity unlock operation has completed), should the user so choose. In these embodiments, electronic device 202 continues to present the unlocking interface while performing the remainder of the proximity unlock operation as described in FIG. 5. In these embodiments, when the user performs the manual authentication step before the proximity unlock operation has completed, electronic device 202 halts/terminates the proximity unlock operation.

Note that steps 504-506 occur when the proximity unlock operation is unsuccessful—in some embodiments, the manual authentication step is not performed when the proximity unlock operation is successful. However, in some embodiments (as described below), a manual authentication step may be performed as a secondary authentication operation during a proximity unlock operation.

After broadcasting the advertisement message (step 502), electronic device 202 may receive, in response, a connection request message from unauthorized electronic device 206. Generally, unauthorized electronic device 206 is not recognized by electronic device 202 (at least for the purposes of the proximity unlock operation) and therefore is not authorized to enable the proximity unlock operation. Thus, unauthorized electronic device 206 has not been selected by a user during a configuration process (see FIG. 4) and therefore does not appear in the list of devices that are permitted to enable the proximity unlock operation in electronic device 202. The connection request received from unauthorized electronic device 206 may or may not be encrypted using a key from a corresponding preliminary pairing operation. When the connection request cannot be decrypted into recognizable information (i.e., decrypts into unrecognizable information), electronic device 202 can disregard the connection request (i.e., not approve or otherwise perform operations based on the connection request). Otherwise, when the connection request can be decrypted into recognizable information, electronic device 202 can extract some or all of the information from the connection request, determine that unauthorized electronic device 206 is unrecognized using the list of devices permitted to enable the proximity unlock operation, and disregard the connection request. In this way, electronic device 202 does not perform the proximity unlock operation based on a connection request from an unauthorized electronic device. In some embodiments, in this case, electronic device 202 presents the above-described unlocking interface on a display of the first electronic device.

After broadcasting the advertisement message (step 502), electronic device 202 receives a connection request message comprising a connection request from authorized electronic device 204 (step 508). As described above, electronic device 202 uses a low-power protocol such as BLE or ZigBee to monitor for the connection request message from authorized electronic device 204. The connection request message is formatted and handled in accordance with the underlying protocol (e.g., limited to a corresponding number of bits/bytes, broadcast on a particular schedule, etc.). In some embodiments, the connection request message was encrypted using a corresponding key from the pairing information by electronic device 204.

Upon receiving the connection request message, electronic device 202 can extract information from the connection request (e.g., a device identifier, a user account identifier, a certificate, etc.). For example, in some embodiments, electronic device 202 decrypts the connection request message using the corresponding key from the pairing information and extracts the information from the decrypted connection request message. Electronic device 202 can then compare the extracted information to information in the list of devices that are permitted to enable the proximity unlock operation (recall that the list of devices that are permitted to enable the proximity unlock operation includes information added during the configuration operation shown in FIG. 4) and determine that authorized electronic device 204 is permitted to enable the proximity unlock operation. Based on the determination that authorized electronic device 204 is permitted to enable the proximity unlock operation, electronic device 202 can approve the connection request. Upon approving the connection request, electronic device 202 transitions from the locked operating state to the unlocked operating state (step 510). Recall that, in the unlocked operating state, one or more functions of electronic device 202 are enabled (accessible, turned on, etc.).

Note that, in some embodiments, no connection is intended to be formed between electronic device 202 and authorized electronic device 204 (other than for the communication of the above-described advertisement message and connection request). In these embodiments, the connection request is therefore requested (via the advertisement message) and received from authorized electronic device 204 to determine whether authorized electronic device 204 is in proximity to electronic device 202. Thus, electronic device 202 may discard the connection request received from authorized electronic device 204, may respond with a rejection message informing authorized electronic device 204 that no connection is to be made, and/or may otherwise handle the connection request received from authorized electronic device 204.

In some embodiments, upon transitioning to the unlocked operating state as described, electronic device 202 presents the user with an information message indicating that electronic device 202 was automatically unlocked using a proximity unlock operation. For example, electronic device 202 can present a pop-up message on a display screen in display subsystem 108, the pop-up message indicating that electronic device 202 was unlocked by authorized electronic device 204 (e.g., using identity information acquired from the connection request message and/or from the list of devices that are permitted to enable the proximity unlock operation). As another example, electronic device 202 can make a particular sound or vibrate in a predetermined pattern to indicate that the proximity unlock operation has occurred.

In some embodiments, after transitioning to the unlocked operating state, electronic device 202 does not broadcast subsequent advertisement messages, even if the time period (see step 504) has not expired.

Although embodiments are described in which electronic device 202 receives an activation input (step 500), in some embodiments, electronic device 202 does not receive the activation input. Instead, in these embodiments, while in the locked operating state, electronic device 202 periodically (and continuously) broadcasts advertisement messages. In these embodiments, the operations performed by electronic device 202 are otherwise similar to those shown in FIG. 5—with the exception of step 500 (which is not performed) and steps 504-506, because there is no timeout period (i.e., electronic device 202 advertises periodically and does not use a timeout period). In these embodiments, electronic device 202 is unlocked (i.e., the proximity unlock operation is performed) when the user brings authorized electronic device 204 within proximity of electronic device 202, without user input to electronic device 202 (i.e., no key-press, mouse movement, touches on a touch screen, etc.).

Secondary Authentication

Although a single-factor authentication process is shown in FIG. 5 (i.e., an authentication process based only on information from the connection request), in some embodiments, electronic device 202 uses two or more additional authentication factors to determine if the connection request is to be approved. In some of these embodiments, along with the authentication based on the connection request, one or more secondary authentication operations is to be performed successfully before a connection request is approved and, thus, before electronic device 202 is transitioned from the locked operating state to the unlocked operating state.

In some embodiments, the authentication processes are associated with corresponding levels of security. For example, in some embodiments, the least secure of the authentication processes is the single-factor authentication process, such as that shown in FIG. 5 (i.e., proximity of authorized electronic device 204 to electronic device 202). The single-factor authentication process may be used to replace a typical single-factor authentication process (i.e., a manual authentication operation such as a password entry, a fingerprint scan, etc.), which is convenient for a user—but is relatively less secure than the multi-factor authentication processes described in this section. As another example, a higher level of security is achieved using a two-factor authentication process, such as both: (1) the proximity of authorized electronic device 204 to electronic device 202, and (2) the entry of a password into electronic device 202 (or a fingerprint scan using authorized electronic device 204). The two-factor authentication process can be used to augment a typical single factor authentication process (e.g., a manual authentication operation such as a password entry, a fingerprint scan, etc.) with the requirement that a user's authorized device (e.g., smart phone, wearable device, etc.) be nearby when the single-factor authentication process is performed (e.g., as a password is entered into electronic device 202, as the fingerprint scan is performed on authorized electronic device 204, etc.). As yet another example, a highest level of security is achieved using a three-factor authentication process, such as all of: (1) the proximity of authorized electronic device 204 to electronic device 202, (2) the entry of a password into electronic device 202, and (3) a fingerprint scan using authorized electronic device 204. The three-factor authentication process can be used to augment a typical single factor authentication process (e.g., a manual authentication operation such as a password entry, a fingerprint scan, etc.) with the requirement that a user's authorized device (e.g., smart phone, wearable device, etc.) be nearby when the single-factor authentication process is performed (e.g., as a password is entered into electronic device 202), and that the user perform a corresponding operation using the authorized electronic device 204 (e.g., a fingerprint scan). In some embodiments, due to the corresponding higher levels of security, the multi-factor authentication operations can be used to enable operations in addition to performing the proximity unlock operation herein described (e.g., operations with greater security implications than the unlock of electronic device 202), such as network logins, account sign-ins, file/directory access permission acquisition, application startup, etc.

As described above, the secondary authentication may happen on electronic device 202 itself, such as when the user enters a password using a keyboard on electronic device 202, or may happen on another device, such as when the user uses a fingerprint scanner on authorized electronic device 204 to scan a fingerprint. In embodiments where the secondary authentication operation is performed on another device, electronic device 202 may communicate with authorized electronic device 204 to cause the secondary operation to happen (using BLE, ZigBee, an infrastructure network such as a WiFi network provided by access point 208, etc.) and to acquire a result from the secondary authentication operation.

Figure 6:
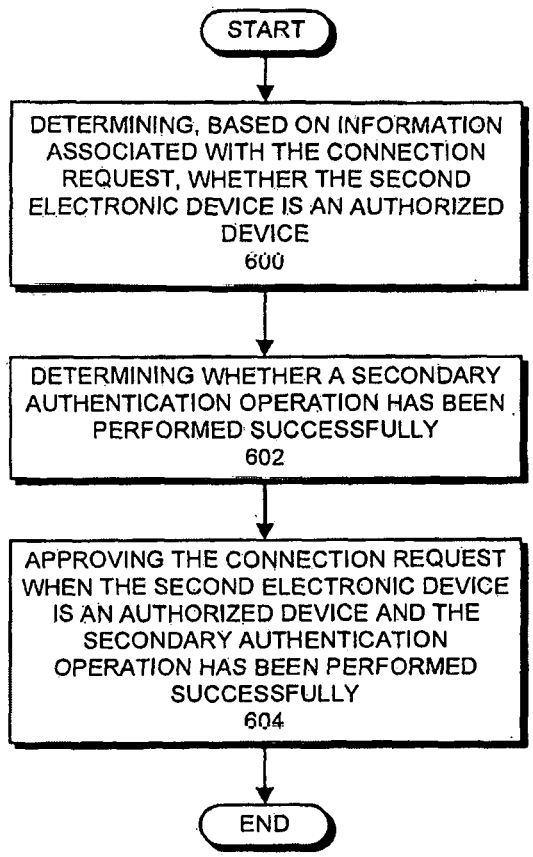
FIG. 6 presents a flowchart illustrating a multi-factor authentication process in accordance with some embodiments.

FIG. 6 presents a flowchart illustrating a multi-factor authentication process in accordance with some embodiments. More specifically, during the process shown in FIG. 6, electronic device 202 approves a connection request based on: (1) the connection request and (2) the successful completion of a secondary authentication operation. Note that the operations shown in FIG. 6 are presented as a general example of operations performed by some embodiments. The operations performed by other embodiments include different operations and/or operations that are performed in a different order. Additionally, although certain mechanisms are used in describing the operations (e.g., electronic device 202, authorized electronic device 204, etc.), in some embodiments, other electronic devices perform the operations.

The process shown in FIG. 6 starts when electronic device 202 (as part of step 510 of FIG. 5) determines, based on information associated with a connection request received from authorized electronic device 204, whether authorized electronic device 204 is an authorized device (step 600). As described above, authorized electronic device 204 is an authorized device. (If authorized electronic device 204 was not an authorized device, electronic device 202 would determine that authorized electronic device 204 is unrecognized and disregard the connection request.)

Electronic device 202 also determines whether a secondary authentication operation has been performed successfully (step 602). For example, electronic device 202 can determine if spoken authentication phrase was received from a user by electronic device 202. As another example, electronic device 202 can determine if a password was entered into electronic device 202 correctly. As another example, electronic device 202 can communicate to authorized electronic device 204 to determine if a fingerprint scan was successfully performed by authorized electronic device 204. Generally, in these embodiments, the secondary authentication operation can include any secondary authentication operation that can be performed on one or both of electronic device 202 and authorized electronic device 204. It is assumed that the secondary authentication operation is performed successfully. (If not, electronic device 202 would disregard the connection request.)

After determining that authorized electronic device 204 is an authorized device and that the secondary authentication operation has been performed successfully, electronic device 202 approves the connection request (step 604). As described above, upon approving the connection request, electronic device 202 transitions from the locked operating state to an unlocked operating state (see step 510).

Figure 7:
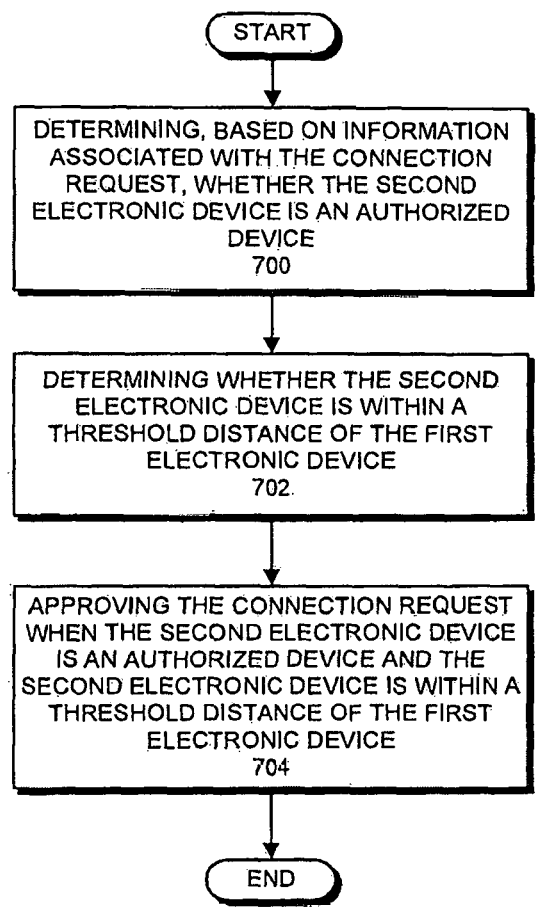
FIG. 7 presents a flowchart illustrating a multi-factor authentication process in accordance with some embodiments.

FIG. 7 presents a flowchart illustrating a multi-factor authentication process in accordance with some embodiments. More specifically, during the process shown in FIG. 7, electronic device 202 approves a connection request based on: (1) the connection request and (2) physical proximity of authorized electronic device 204 to electronic device 202. Note that the operations shown in FIG. 7 are presented as a general example of operations performed by some embodiments. The operations performed by other embodiments include different operations and/or operations that are performed in a different order. Additionally, although certain mechanisms are used in describing the operations (e.g., electronic device 202, authorized electronic device 204, etc.), in some embodiments, other electronic devices perform the operations.

The process shown in FIG. 7 starts when electronic device 202 (as part of step 510 of FIG. 5) determines, based on the information associated with a connection request received from authorized electronic device 204, whether authorized electronic device 204 is an authorized device (step 700). As described above, authorized electronic device 204 is an authorized device. (If authorized electronic device 204 was not an authorized device, electronic device 202 would determine that authorized electronic device 204 is unrecognized and disregard the connection request.)

Electronic device 202 also determines whether authorized electronic device 204 is within a threshold distance of electronic device 202 (e.g., in a room, in a building, etc.) (step 702). In these embodiments, electronic device 202 may use one or more techniques for determining whether authorized electronic device 204 is within the threshold distance. For example, electronic device 202 may use a radio signal property (e.g., signal strength, frequency, timing, etc.) of a radio signal (compared to previously-known signal properties) used to transmit the connection request from authorized electronic device 204 to electronic device 202 to determine a distance of authorized electronic device 204 from electronic device 202. As another example, electronic device 202 may communicate with other electronic devices such as access point 208 to determine if authorized electronic device 204 is in communication with the other devices, and thereby determine that authorized electronic device 204 is within the threshold distance. As another example, electronic device 202 may request that authorized electronic device 204 play an audible sound, flash a light, or otherwise perform a perceivable action that electronic device 202 can use one or more sensors (microphones, photovoltaic sensors, etc.) to detect and thereby determine a location of authorized electronic device 204. It is assumed that the authorized electronic device 204 is within the threshold distance. (If not, electronic device 202 would disregard the connection request.)

After determining that authorized electronic device 204 is an authorized device and that authorized electronic device 204 is within the threshold distance from electronic device 202, electronic device 202 approves the connection request (step 704). As described above, upon approving the connection request, electronic device 202 transitions from the locked operating state to an unlocked operating state.

Proximity Lock Operation

In some embodiments, electronic devices perform a proximity lock operation. For the proximity lock operation, a first electronic device (e.g., electronic device 202) that was transitioned to the unlocked operating state using a proximity unlock operation monitors for the continued proximity of a second electronic that enabled the proximity unlock operation (e.g., authorized electronic device 204). When the first electronic device can no longer detect authorized the second electronic device in proximity to the first electronic device, the first electronic device transitions from the unlocked operating state to the locked operating state. In these embodiments, the transition to the locked operating state occurs without the user performing a manual locking step on the first electronic device to cause the transition (i.e., a manual locking step that is performed in existing electronic devices).

Figure 8:
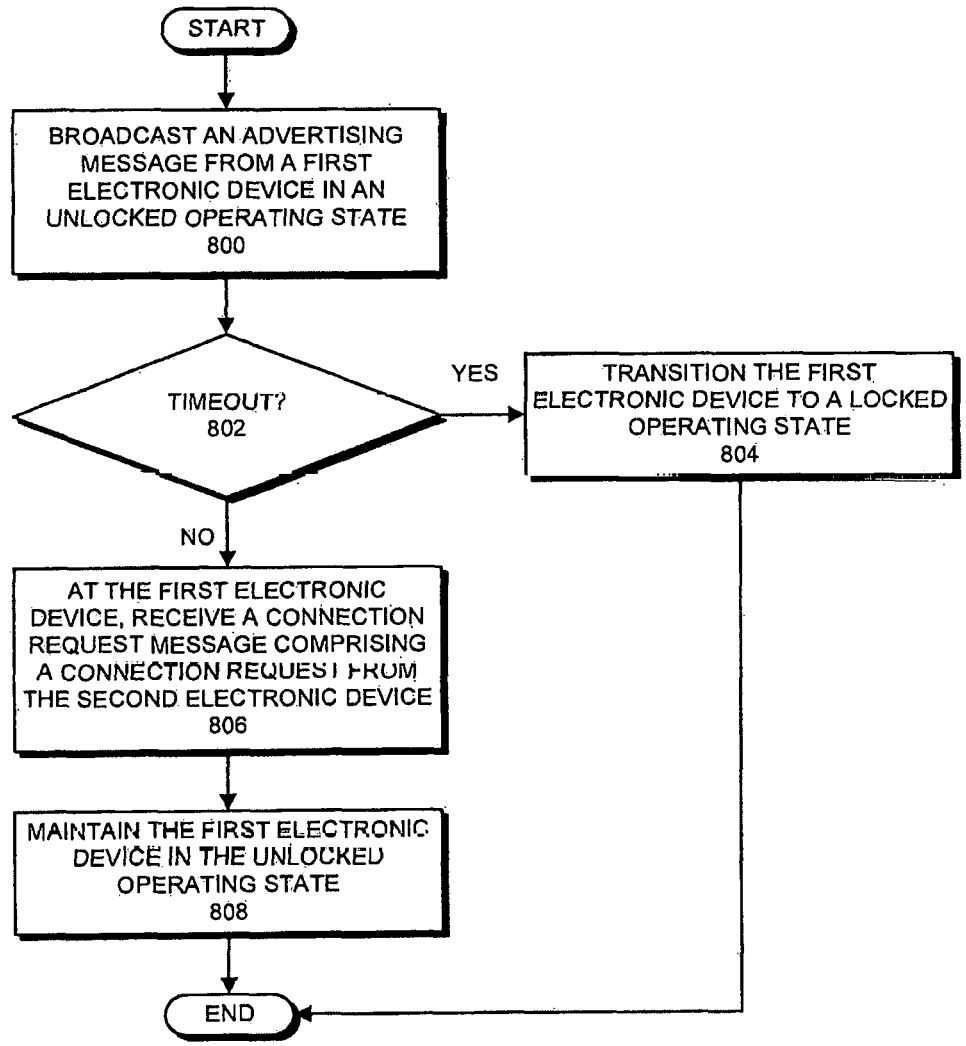
FIG. 8 presents a flowchart illustrating a process for a proximity lock operation in accordance with some embodiments.

FIG. 8 presents a flowchart illustrating a process for a proximity lock operation in accordance with some embodiments. More specifically, during the process shown in FIG. 8, electronic device 202 transitions to the locked operating state after being transitioned to the unlocked operating state during a proximity unlock operation enabled by authorized electronic device 204. Note that the operations shown in FIG. 8 are presented as a general example of operations performed by some embodiments. The operations performed by other embodiments include different operations and/or operations that are performed in a different order. Additionally, although certain mechanisms are used in describing the operations (e.g., electronic device 202, authorized electronic device 204, etc.), in some embodiments, other electronic devices perform the operations.

The process shown in FIG. 8 starts with electronic device 202 broadcasting an advertisement message while in the unlocked operating state (step 800). Generally, this advertisement message is broadcast in order to prompt authorized electronic device 204 to respond with a connection request message, thereby confirming authorized electronic device 204's proximity to electronic device 202. In some embodiments, includes an indication that electronic device 202 is searching for electronic devices that provide a proximity unlock operation service (similar to the advertisement message for the proximity unlock operation described above). In some embodiments, the advertisement message is encrypted using the key from the above-described pairing information.

In some embodiments, electronic device 202 is configured to wait for a predetermined time for a connection request message from authorized electronic device 204 in response to the advertisement message, and, if no connection request message is received, transition to the locked operating state. For example, in some embodiments, when broadcasting the advertisement message, electronic device 202 starts a timer. If a timeout occurs (e.g., if the timer expires) before a connection request message is received from authorized electronic device 204 (step 802), electronic device 202 transitions to the locked operating state (step 804). However, if, before the timeout (step 802), a connection request message is received (step 806), electronic device 202 remains in the unlocked operating state (step 808). In these embodiments, electronic device 202 verifies that the connection request came from authorized electronic device 204 using information associated with the connection request as described above (e.g., decrypts the connection request using a key from the pairing information and extracts information therefrom to be used to verify that the connection request came from authorized electronic device 204).

Note that, in some embodiments, no connection is intended to be formed between electronic device 202 and authorized electronic device 204 (other than for the communication of the above-described advertisement message and connection request). In these embodiments, the connection request is therefore requested (via the advertisement message) and received from authorized electronic device 204 only to ensure that authorized electronic device 204 is still/remains in proximity to electronic device 202. Thus, electronic device 202 may discard the connection request received from authorized electronic device 204, may respond with a rejection message informing authorized electronic device 204 that no connection is to be made, and/or may otherwise handle the connection request received from authorized electronic device 204.

In some embodiments, electronic device 202 broadcasts an advertisement message periodically (e.g., every K seconds, where K is a number such as 3, 10, etc.) and the above-described advertisement message is one of these advertisement messages. By periodically broadcasting advertisement messages and handling the corresponding connection request from authorized electronic device 204 as shown in FIG. 8, electronic device 202 can ensure that authorized electronic device 204 is still in proximity to electronic device 202 after the proximity unlock operation is complete. This can improve the user experience by enabling the user to automatically lock electronic device 202 by simply walking away from electronic device 202 and/or can improve security by preventing a user from leaving the area of electronic device 202 without locking electronic device 202.

Although embodiments are described where electronic device 202 simply transitions to the locked operating state, in some embodiments, electronic device 202 may present the user with a warning for a predetermined time before transitioning to the locked operating state. In these embodiments, the user may need to perform a manual authentication step such as entering a password to prevent electronic device 202 from transitioning to the locked operating state.

In addition, although one advertisement message is described as being broadcast periodically, when a response is not received, electronic device 202 may broadcast one or more additional advertisement messages (i.e., in addition to any that would have been broadcast anyhow) in an attempt to elicit a connection request from authorized electronic device 204. In some of these embodiments, the one or more advertisement messages may be broadcast with a different (e.g., shorter) period.

Messages Exchanged Between Electronic Devices

Figure 9:
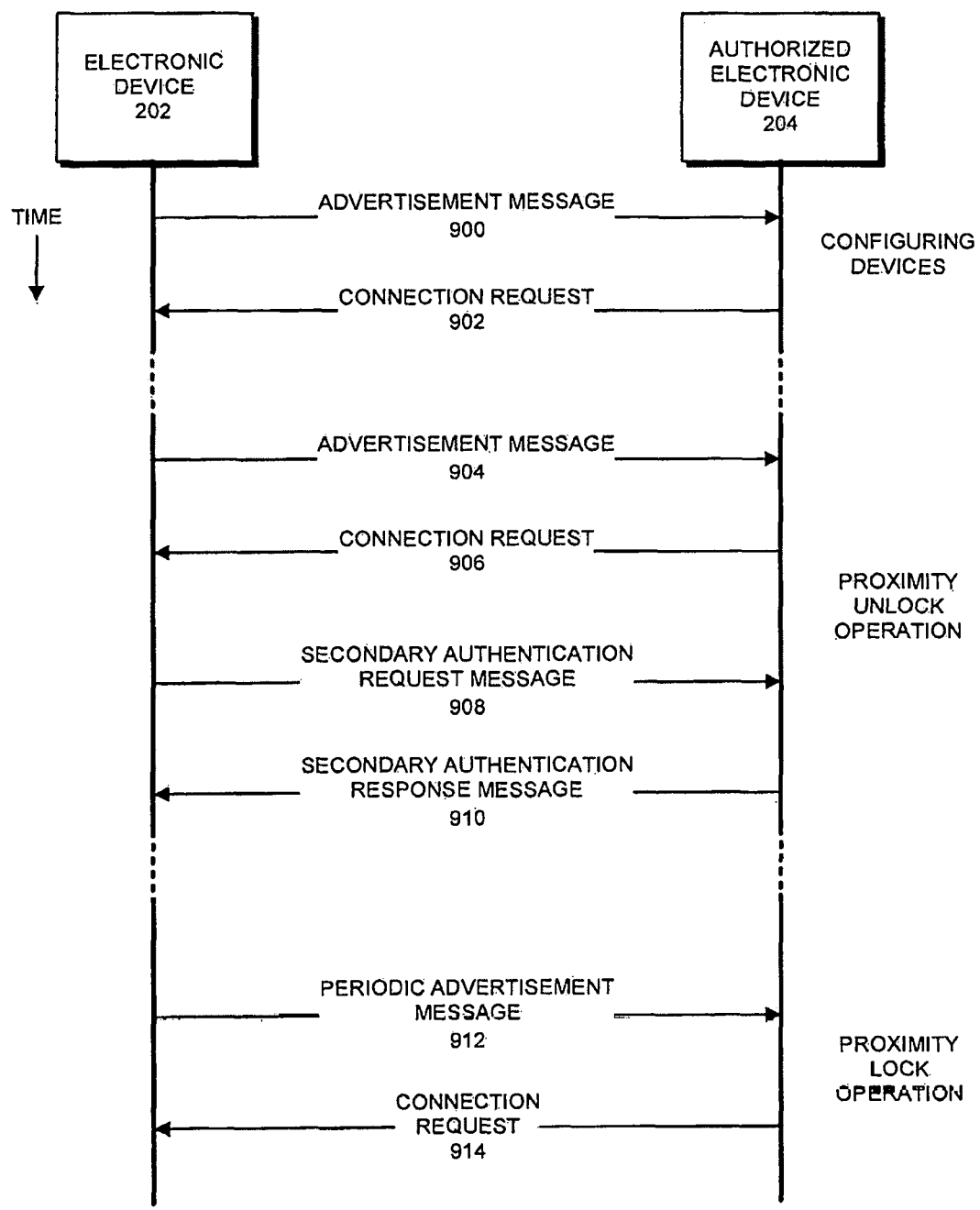
FIG. 9 presents a swim lane diagram illustrating messages exchanged between electronic devices in accordance with some embodiments.

FIG. 9 presents a swim lane diagram illustrating messages exchanged between electronic devices in accordance with some embodiments. As can be seen in FIG. 9, the messages are exchanged between electronic device 202 and authorized electronic device 204 over a period of time, with advertisement message 900 occurring first in time and the messages lower in FIG. 9 occurring later in time. In the diagram, separations in time are indicated by dashed lines such as between connection request 902 and advertisement message 904, so that some delay in time may occur between the corresponding messages. Although FIG. 9 is shown with messages exchanged in a particular order, in some embodiments, other messages are exchanged and/or messages are exchanged in a different order. Generally, electronic devices in the described embodiments exchange sufficient messages to enable the operations herein described.

The messages in FIG. 9 are associated with three operations performed by electronic device 202 and/or authorized electronic device 204. The first operation, which includes advertisement message 900 and connection request message 902, is a device configuration operation such as is shown in FIG. 4. During the configuration operation, electronic device 202 broadcasts at least one advertisement message 900. Upon receiving the advertisement message 900, authorized electronic device 204 responds with connection request 902. In some embodiments, advertisement message 900 and connection request message 902 are encrypted and decrypted using corresponding keys from the pairing information. In some embodiments, upon receiving connection request message 902, determining that the incorporated connection request is from an authorized device, and receiving a selection of authorized electronic device 204, electronic device 202 adds authorized electronic device 204 to a list of devices that are permitted to enable the proximity unlock operation.

The second operation, which includes advertisement message 904 and connection request message 906, as well as an optional secondary authentication request message 908 and secondary authentication response message 910, is a proximity unlock operation such as shown in FIG. 5. During the proximity unlock operation, electronic device 202 (upon receiving an activation input) broadcasts at least one advertisement message 904. Upon receiving the advertisement message 904, authorized electronic device 204 responds with connection request 906. Advertisement message 904 and connection request message 906 are encrypted and decrypted using corresponding keys from the pairing information. In some embodiments, upon receiving connection request message 906 and determining that the incorporated connection request is from an authorized device, electronic device 202 transitions from a locked operating state to an unlocked operating state.

In some embodiments, the proximity unlock operation is modified to include at least one additional factor of authentication in addition to the connection request. Some embodiments of secondary authentication factors are described above for FIGS. 6-7. In some of these embodiments, performing the additional factors includes communicating a command to perform the additional factor from electronic device 202 to authorized electronic device 204, where the additional factor (fingerprint scan, voice recognition, etc.) is performed. In these embodiments, secondary authentication request message 908 is sent from electronic device 202 to authorized electronic device 204. In response, authorized electronic device 204 sends secondary authentication message 910. In these embodiments, based on whether or not secondary authentication message 910 indicates that the second factor was successful (as well as connection request 906 being from an authorized electronic device), electronic device 202 can transition from the locked operating state to the unlocked operating state (or remain in the locked operating state).

Figure 11:
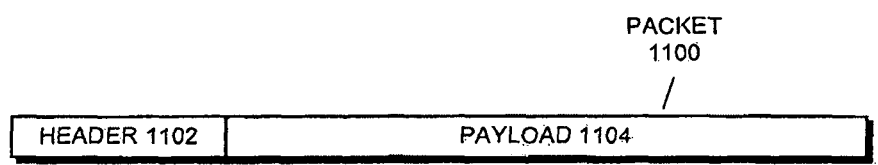
FIG. 11 presents a block diagram illustrating a packet that contains a message in accordance with some embodiments.

The third operation, which includes periodic advertisement message 912 and connection request message 914 is the proximity lock operation such as shown in FIG. 8. During the proximity lock operation, after being enabled in a proximity unlock operation by authorized electronic device 204, electronic device 202 broadcasts at least one periodic advertisement message 912. Upon receiving periodic advertisement message 912, authorized electronic device 204 responds with connection request 914. In some embodiments, upon receiving connection request message 914 and determining that the incorporated connection request is from authorized electronic device 204, electronic device 202 remains in the unlocked operating state. However, if connection request 914 is not received from authorized electronic device 204 in sufficient time, electronic device 202 may transition to a locked operating state As described above, the messages exchanged between electronic device 202 and authorized electronic device 204 include various information that is configured to enable electronic device 202 or authorized electronic device 204 to determine the nature of the message (advertisement message, connection request, etc.), the identity of a device that sent the message (e.g., packet header information, information included in a payload of the packet, etc.), the particulars of a communication session, and/or other information about the sender or the message. FIG. 11 presents a block diagram illustrating a packet that contains a message in accordance with some embodiments. As can be seen in FIG. 11, packet 1100 includes header 1102 and payload 1104. Header 1102 includes information describing the packet, the sending and receiving electronic devices, the communication session, etc. Payload 1104 includes information based on the type of message. For example, payload 1104 may include message type identifiers, device information, information fields, data, etc. In some embodiments, as described above, a public key in a sending electronic device is used to encrypt payload 1104 and a private key in a receiving electronic device is used to decrypt payload 1104. In these embodiments, the public/private key are negotiated/established between electronic devices during the preliminary pairing operation.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A method, comprising:
   in a first electronic device, performing operations for:
      broadcasting an advertisement message;
      receiving a connection request message that comprises a connection request from a second electronic device in response to the advertisement message;
      determining the second electronic device is an authorized device, wherein the determining comprises decrypting information in the connection request using a key acquired during a preliminary pairing operation the first electronic device and the second electronic device that is triggered by a service provider electronic device;
      determining a distance of the second electronic device from the first electronic device based at least in part on a signal property of a signal generated by the second electronic device;

determining that the distance of the second electronic device from the first electronic device is within a threshold distance, wherein the threshold distance is within a signal range of the second electronic device; and transitioning the first electronic device from a locked operating state to an unlocked operating state based at least in part on the determination that the second electronic device is an authorized device, the determined distance of the second electronic device from first electronic device is within the threshold distance, and verification of a voice scan.

2. The method of claim 1, further comprising:
in the first electronic device, performing operations for:
maintaining the first electronic device in the locked operating state when a timeout time period passes after broadcasting the advertisement message without receiving a second connection request message from another electronic device; and
presenting an interface for unlocking the first electronic device on a display of the first electronic device based at least in part on the maintaining.

3. The method of claim 1, further comprising:
in the first electronic device, performing operations for:
after transitioning the first electronic device to the unlocked operating state, broadcasting a periodic advertisement message; and
when a timeout time period passes after broadcasting the periodic advertisement message without receiving a second connection request message from the second electronic device, transitioning the first electronic device from the unlocked operating state to the locked operating state.

4. The method of claim 1, further comprising:
in the first electronic device, performing operations for:
receiving an activation input while the first electronic device is in the locked operating state, wherein the receiving the activation input comprises receiving an input via one or more input devices of the first electronic device.

5. The method of claim 1, wherein the broadcasting the advertisement message comprises:
generating the advertisement message, the advertisement message comprising an identification of the first electronic device; and
transmitting the advertisement message via a corresponding network interface of the first electronic device.

6. The method of claim 1, wherein, in the locked operating state, one or more functions of the first electronic device are disabled and, in the unlocked operating state, the one or more functions are enabled.

7. The method of claim 1, wherein the broadcasting the advertisement message and the receiving the connection request message from the second electronic device are performed using a Bluetooth low-energy (BLE) network interface in the first electronic device.

8. The method of claim 1, wherein the preliminary pairing operation between the first electronic device and the second electronic device is triggered by the service provider electronic device transmitting a message to the second electronic device.

9. A method, comprising:
in a first electronic device, performing operations for:
broadcasting an advertisement message;
receiving a connection request message that comprises a connection request from a second electronic device in response to the advertisement message;
determining the second electronic device is an authorized device, wherein the determining comprises decrypting information in the connection request using a key acquired during a preliminary pairing operation between the first electronic device and the second electronic device that is triggered by a service provider electronic device;
determining a distance of the second electronic device from the first electronic device based at least in part on a signal property of a signal generated by the second electronic device;
determining that the distance of the second electronic device from the first electronic device is within a threshold distance, wherein the threshold distance is within a signal range of the second electronic device; and
transitioning the first electronic device from a locked operating state to an unlocked operating state based at least in part on the determination that the second electronic device is an authorized device, the determined distance of the second electronic device from first electronic device is within the threshold distance, and verification of a fingerprint scan.

10. The method of claim 9, further comprising:
in the first electronic device, performing operations for:
maintaining the first electronic device in the locked operating state when a timeout time period passes after broadcasting the advertisement message without receiving a second connection request message from another electronic device; and
presenting an interface for unlocking the first electronic device on a display of the first electronic device based at least in part on the maintaining.

11. The method of claim 9, further comprising:
in the first electronic device, performing operations for:
after transitioning the first electronic device to the unlocked operating state, broadcasting a periodic advertisement message; and
when a timeout time period passes after broadcasting the periodic advertisement message without receiving a second connection request message from the second electronic device, transitioning the first electronic device from the unlocked operating state to the locked operating state.

12. The method of claim 9, further comprising:
in the first electronic device, performing operations for:
receiving an activation input while the first electronic device is in the locked operating state, wherein the receiving the activation input comprises receiving an input via one or more input devices of the first electronic device.

13. The method of claim 9, wherein the broadcasting the advertisement message comprises:
generating the advertisement message, the advertisement message comprising an identification of the first electronic device; and
transmitting the advertisement message via a corresponding network interface of the first electronic device.

14. The method of claim 9, wherein, in the locked operating state, one or more functions of the first electronic device are disabled and, in the unlocked operating state, the one or more functions are enabled.

15. The method of claim 9, wherein the broadcasting the advertisement message and the receiving the connection request message from the second electronic device are performed using a Bluetooth low-energy (BLE) network interface in the first electronic device.

16. A method, comprising:
in a first electronic device, performing operations for:
broadcasting an advertisement message;
receiving a connection request message that comprises a connection request from a second electronic device in response to the advertisement message;
determining the second electronic device is an authorized device, wherein the determining comprises decrypting information in the connection request using a key acquired during a preliminary pairing operation between the first electronic device and the second electronic device that is triggered by a service provider electronic device;
determining a distance of the second electronic device from the first electronic device based at least in part on a signal property of a signal generated by second electronic device;
determining that the distance of the second electronic device from the first electronic device is within a threshold distance, wherein the threshold distance is within a signal range of the second electronic device; and
transitioning the first electronic device from a locked operating state to an unlocked operating state based at least in part on the determination that the second electronic device is an authorized device, the determined distance of the second electronic device from first electronic device is within the threshold distance, and verification of an image capture associated with an authorized user.

17. The method of claim 16, farther comprising:
in the first electronic device, performing operations for:
maintaining the first electronic device in the locked operating state when a timeout time period passes after broadcasting the advertisement message without receiving a second connection request message from another electronic device; and
presenting an interface for unlocking the first electronic device on a display of the first electronic device based at least in part on the maintaining.

18. The method of claim 16, farther comprising:
in the first electronic device, performing operations for:
after transitioning the first electronic device to the unlocked operating state, broadcasting a periodic advertisement message; and
when a timeout time period passes after broadcasting the periodic advertisement message without receiving a second connection request message from the second electronic device, transitioning the first electronic device from the unlocked operating state to the locked operating state.

19. The method of claim 16, further comprising:
in the first electronic device, performing operations for:
receiving an activation input while the first electronic device is in the locked operating state, wherein the receiving the activation input comprises receiving an input via one or more input devices of the first electronic device.

20. The method of claim 16, wherein the broadcasting the advertisement message comprises:
generating the advertisement message, the advertisement message comprising an identification of the first electronic device; and
transmitting the advertisement message via a corresponding network interface of the first electronic device.

21. The method of claim 16, wherein, in the locked operating state, one or more functions of the first electronic device are disabled and, in the unlocked operating state, the one or more functions are enabled.

* * * * *